(12) United States Patent
Wilson et al.

(10) Patent No.: US 7,445,126 B2
(45) Date of Patent: Nov. 4, 2008

(54) SELF-ADJUSTING GOODS DISPLAY SYSTEM AND METHOD

(75) Inventors: Peter D. Wilson, Bellevue, WA (US); Robert H. Afflerbach, Bellevue, WA (US)

(73) Assignee: Pacific Bin Corporation, Bellevue, WA (US)

( * ) Notice: Subject to any disclaimer, the term of this patent is extended or adjusted under 35 U.S.C. 154(b) by 1092 days.

(21) Appl. No.: 10/718,252

(22) Filed: Nov. 20, 2003

(65) Prior Publication Data

US 2005/0150434 A1    Jul. 14, 2005

(51) Int. Cl.
    *A47F 3/08*    (2006.01)
(52) U.S. Cl. ....................................................... 211/1.51
(58) Field of Classification Search ................ 211/1.51, 211/41.12, 49.1, 59.2, 59.3; 312/319.5, 294
    See application file for complete search history.

(56) References Cited

U.S. PATENT DOCUMENTS

| | | | | |
|---|---|---|---|---|
| 4,662,523 A | * | 5/1987 | Stein et al. | 211/59.2 |
| 4,954,760 A | * | 9/1990 | Futch et al. | 318/480 |
| 5,314,080 A | * | 5/1994 | Wentworth | 211/181.1 |
| 6,000,770 A | * | 12/1999 | Frich | 312/319.7 |
| 6,745,588 B2 | * | 6/2004 | Kahler | 62/246 |

* cited by examiner

*Primary Examiner*—Sarah Purol
(74) *Attorney, Agent, or Firm*—Davis Wright Tremaine LLP; George C. Rondeau, Jr.

(57) ABSTRACT

A self-adjusting goods display system maintains a proper shelf level for a display bin containing goods. An implementation has an open bin with side walls having top edges and a moveable shelf to receive a pile of goods. A light source and a light receiver are positioned on the top edges of opposing walls of the bin, and the light source generates light to be received by the light receiver. When the pile of goods is reduced so that the pile no longer obstructs the light from being received by the light receiver a signal indicates a need to raise the general level of the remaining pile contained in the bin. A controller receives the signal and controls operation of a motor to raise the height of the shelf until the remaining pile of the shelf again blocks the light, or the shelf is at a position of maximum height.

7 Claims, 4 Drawing Sheets

SELF-ADJUSTING GOODS DISPLAY SYSTEM AND METHOD

BACKGROUND OF THE INVENTION

1. Field of the Invention

The present invention is directed generally to displays for goods and, more particularly, to adjustable displays typically for retail goods such as produce.

2. Description of the Related Art

Many goods such as many produce items can be sold by being arranged in bins. For instance, produce items such as apples, oranges, or melons can be placed in a bin to attract customer attention and to provide accessibility to aid customers in selection of particular produce items from the bin. Customers will typically sort through and rearrange the goods in the process of making a purchase of a small quantity of the goods in the bin so that much time and expense is required to maintain a neat appearance of the goods remaining in the bin. Furthermore, each bin is typically restocked frequently with additional goods so that some goods remain near the top of the bin to maintain the visual appeal of the display and easy accessibility of the goods to potential customers. This frequent restocking also requires additional time and expense.

BRIEF SUMMARY OF THE INVENTION

The present invention resides in a system having a shelf with a top surface sized to support objects, at least one support members supportedly coupled to the shelf and configured to move the shelf to adjust the vertical height for the shelf between a lower position and an upper position, and a motive force source coupled to the support members to move the support member. The system further includes a light source positioned to project light along a light path at least in part extending above a portion of the top surface of the shelf while the shelf is in positions below the upper position, and a light receiver positioned to receive the light projected from the light source and to have the light obstructed by at least one of the objects supported by the top surface of the shelf when the shelf is raised to position the at least one object in the light path. A controller is configured to activate the source of motive force source to move the support members to raise the vertical height of the shelf when the light receiver receives the light while the shelf is in positions below the upper position.

The controller may be configured to activate the motive force source to thereby lower the vertical height of the shelf in response to receipt of a lower shelf signal.

In an illustrated embodiment the system includes a bin with a plurality of side walls defining an interior space with an opening to access the interior space from above the bin. A table is positioned in the interior space which includes the shelf.

The present invention may be embodied in a produce display with a bin sized to contain a collection of produce and having an interior space with access from above the bin. A shelf is positioned within the interior space and sized to support the collection of produce. Support members are movably linked to one another and movably coupled to the shelf to adjust the vertical height for the shelf between a lower position and an upper position. A motor with a shaft and a converter are included. The converter is configured to translate rotational motion into linear motion, and is linked to the motor and to at least one of the support members to move the at least one support member and consequently the support members to raise the shelf when the shaft of the motor rotates in a first rotational direction. A light source is positioned to project light across at least one of the following: a portion of the interior space and a portion of space above the interior space, and a light receiver is positioned to receive the light projected from the light source unless collection of produce supported by the shelf is positioned to obstruct the light from reaching the light receiver. A controller is configured to activate the motor to rotate the shaft in the first rotational direction to raise the shelf when the light receiver receives the light and the shelf is below the upper position.

In this embodiment the controller is configured to activate the motor to rotate the shaft in a second rotational direction opposite the first rotational direction to lower the shelf when a lower shelf signal is received by the controller. The support members may be movably linked to one another to form a scissor lift.

The system may include first and second pivot members with the support members movably linked to one another by the first pivot members and with the support members movably coupled to the shelf by the second pivot members.

A bar may be coupled to two of the support members, and the converter may include a screw and a coupler. The shaft of the motor may be drivably coupled to the screw, and the screw threadably attached to the bar such that as the motor rotates the screw the screw applies a linear force to the coupler which is transmitted to the bar to adjustably move the two support members to change the vertical height of the shelf.

The motor may be an electric motor powered by a battery, a pneumatic motor or some other source of motive force. A manual switch may be included to activate the motor.

Other features and advantages of the invention will become apparent from the following detailed description, taken in conjunction with the accompanying drawings.

BRIEF DESCRIPTION OF THE SEVERAL VIEWS OF THE DRAWING(S)

DETAILED DESCRIPTION OF THE INVENTION

As will be discussed in greater detail below, a self-adjusting goods display system maintains a proper shelf level for a display bin containing goods. Proper maintenance of shelf level provides better visual appeal and accessibility to aid in sales of the goods in the bin. Typical goods include produce such as stackable fruit and vegetables, sports items such as various balls, and garden supplies such as bags of various materials, etc. Self-adjustment of shelf level by the display system can greatly reduce labor requirements associated with conventional approaches needed for rearranging and restocking of remaining goods as portions are sold to maintain a satisfactory visual appeal and accessibility of the displayed goods.

Figure 1:
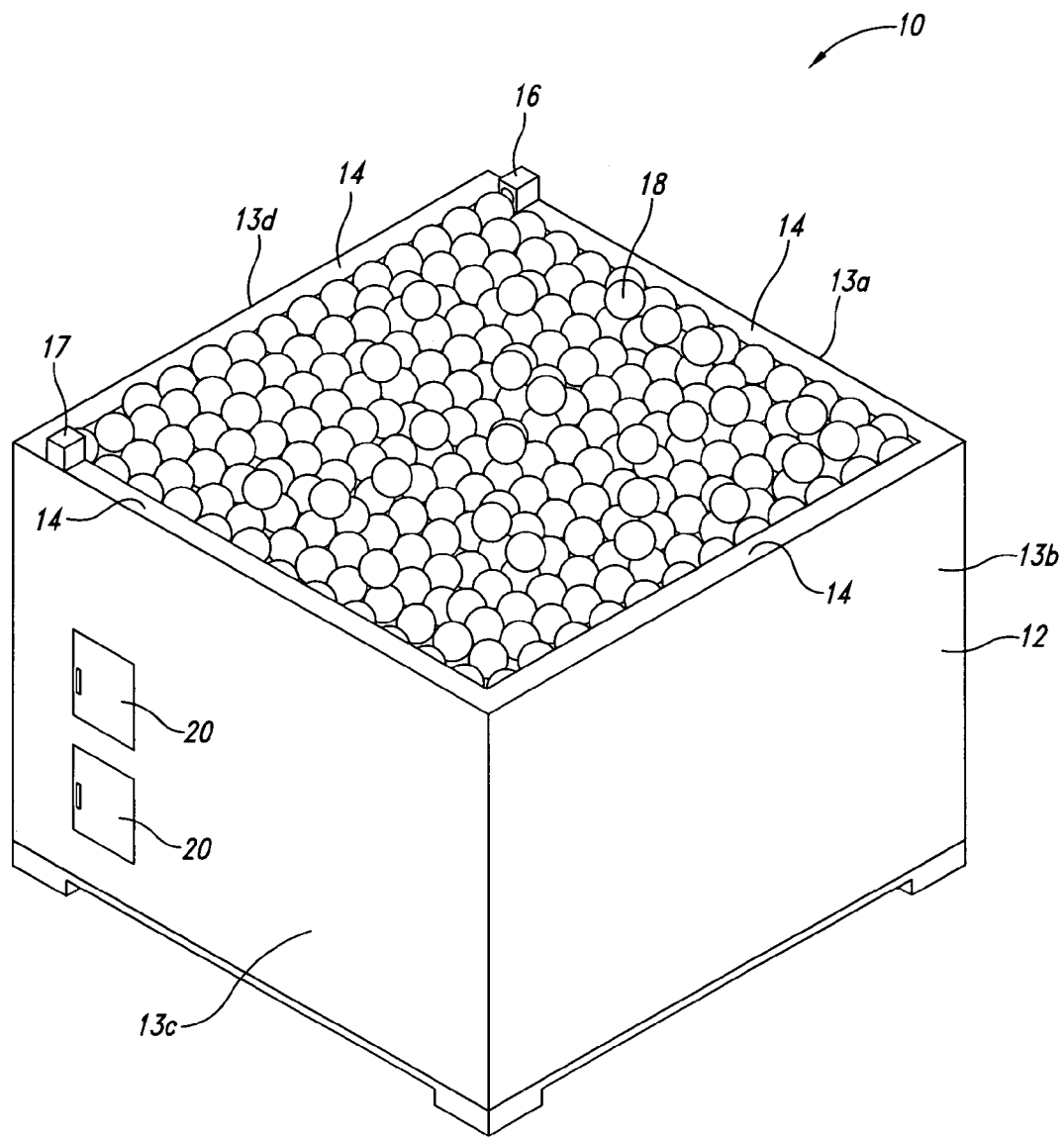
FIG. 1 is an isometric view of an implementation of a self-adjusting goods display system.

An implementation of a self-adjusting goods display system 10 according to the present invention is shown in FIG. 1 as having an open bin 12 with side walls 13*a-d* having top edges 14. The implementation of the open bin 12 is depicted in FIG. 1 as a box structure having four walls 13*a-d*. Other implementations of the bin 12 are envisioned as having other numbers of walls and having symmetrical or asymmetrical shape. A light source 16 and a light receiver 17 are positioned on the top edges 14 of the opposing walls 13a and 13c typically near a third wall (e.g. the wall 13d as shown in FIG. 1) to be less conspicuous, particularly if the third wall 13d can be located against a store wall or the back of a store display or other bin. The light source 16 generates light 22 (shown in FIGS. 3 and 4 as a line). The light 22 is received by the light receiver 17 when shelf adjustment is needed to raise the general level of a pile of goods 18 contained in the open bin 14. This occurs when the pile of goods 18 is no longer obstructing the light from being received by the light receiver 17, as explained further below. The bin 12 further includes doors 20 on one or more of the walls (such as wall 13c depicted in FIG. 1) to provide access to interior components discussed below.

Other implementations (not shown) locate the light source 16 and the light receiver 17 along the top edges 14 of the opposing walls 13a and 13c farther from the third wall 13d than depicted in FIG. 1. If it is desirable for display purposes to have the walls 13a-d of the open bin 12 always extend generally higher than the top surface of the pile of goods 18, the light source 16 and the light receiver 17 can also be located below the top edges 14 either inside or on interior surfaces of the opposing walls 13a and 13c so long as the light 22 can be received by the light receiver 17 at times when the pile of goods 18 are not obstructing the light. Other implementations (not shown) can use a mirror (not shown) located on the wall 13c that reflects light from the light source 16 located on the wall 13a back to the same wall 13a where the light receiver 17 is also located adjacent to the light source.

Figure 3:
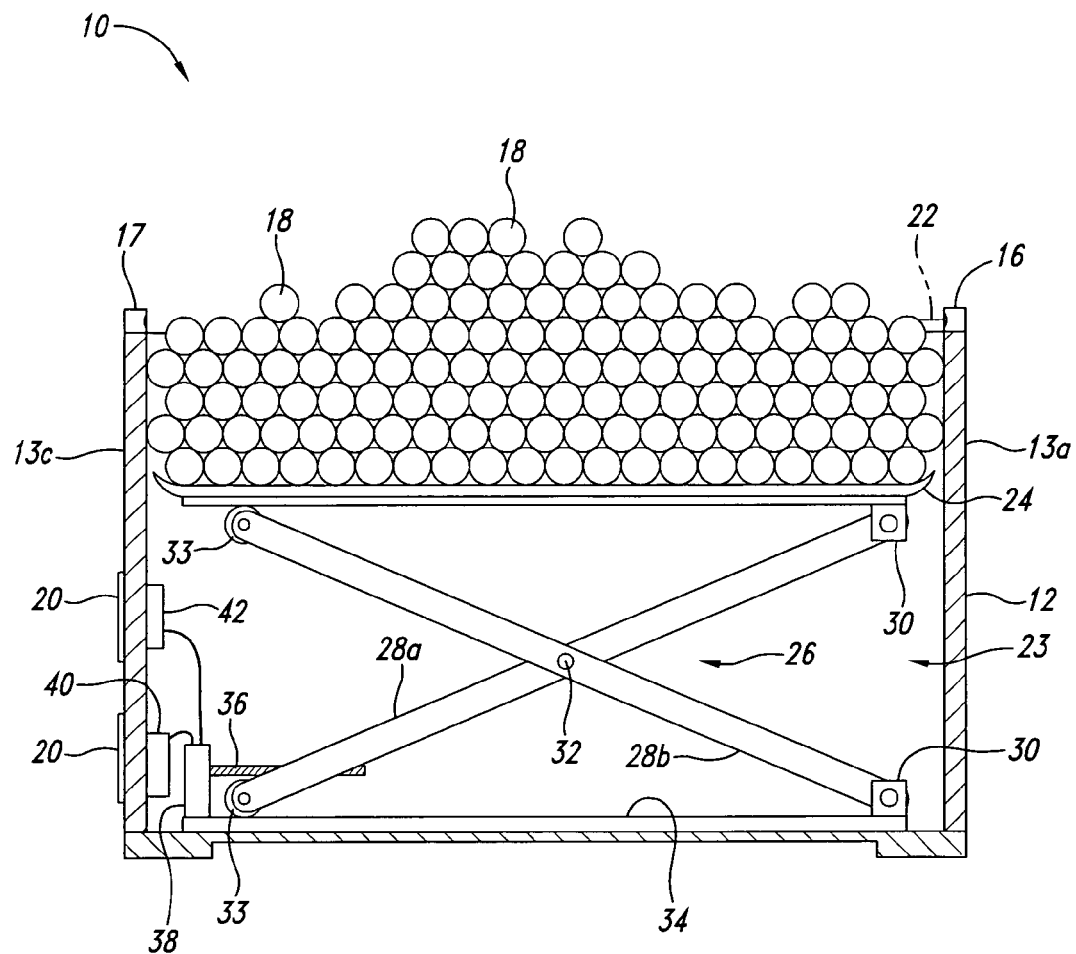
FIG. 3 is a cross-sectional side-elevational view of the self-adjusting goods display system of FIG. 1 containing a first quantity of goods.
Figure 4:
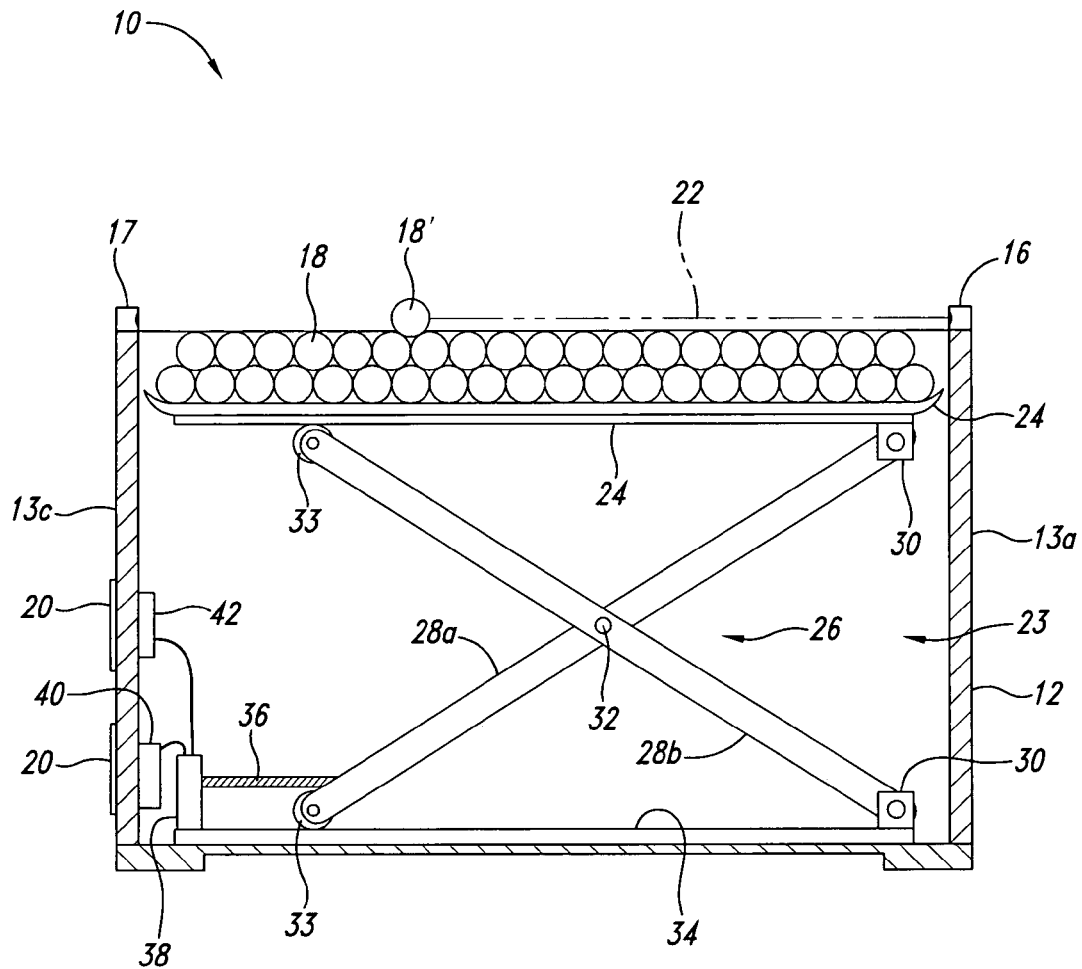
FIG. 4 is a cross-sectional side-elevational view of the self-adjusting display system of FIG. 1 containing a second quantity of goods less than the first quantity of goods.

The self-adjusting goods display system 10 further includes a variable height table 23 with its table top providing a shelf 24 on which the pile of goods 18 rests, as illustrated in FIGS. 3 and 4. The shelf 24 is supported by a scissor lift 26 having two pairs of scissor support members, each pair having two support members 28a and 28b. The upper end of support member 28a is pivotally coupled to the underside of the shelf with a pivot member 30. The support members 28a and 28b for each pair are coupled together along their midportion with a pivot member 32. The lower end of each support member 28b is pivotally coupled to a base mounting plate 34 with an additional pivot member 30. The lower end of each support member 28a and the upper end of each support member 28b has a roller 33 rotatably attached thereto. The rollers 33 of the support members 28a rollably engage the mounting plate 34 and the rollers of the support members 28b rollably engage the underside of the shelf 24 as the support members 28a and 28b pivot about the pivot members 30 when the scissor lift 26 is operating.

Figure 2:
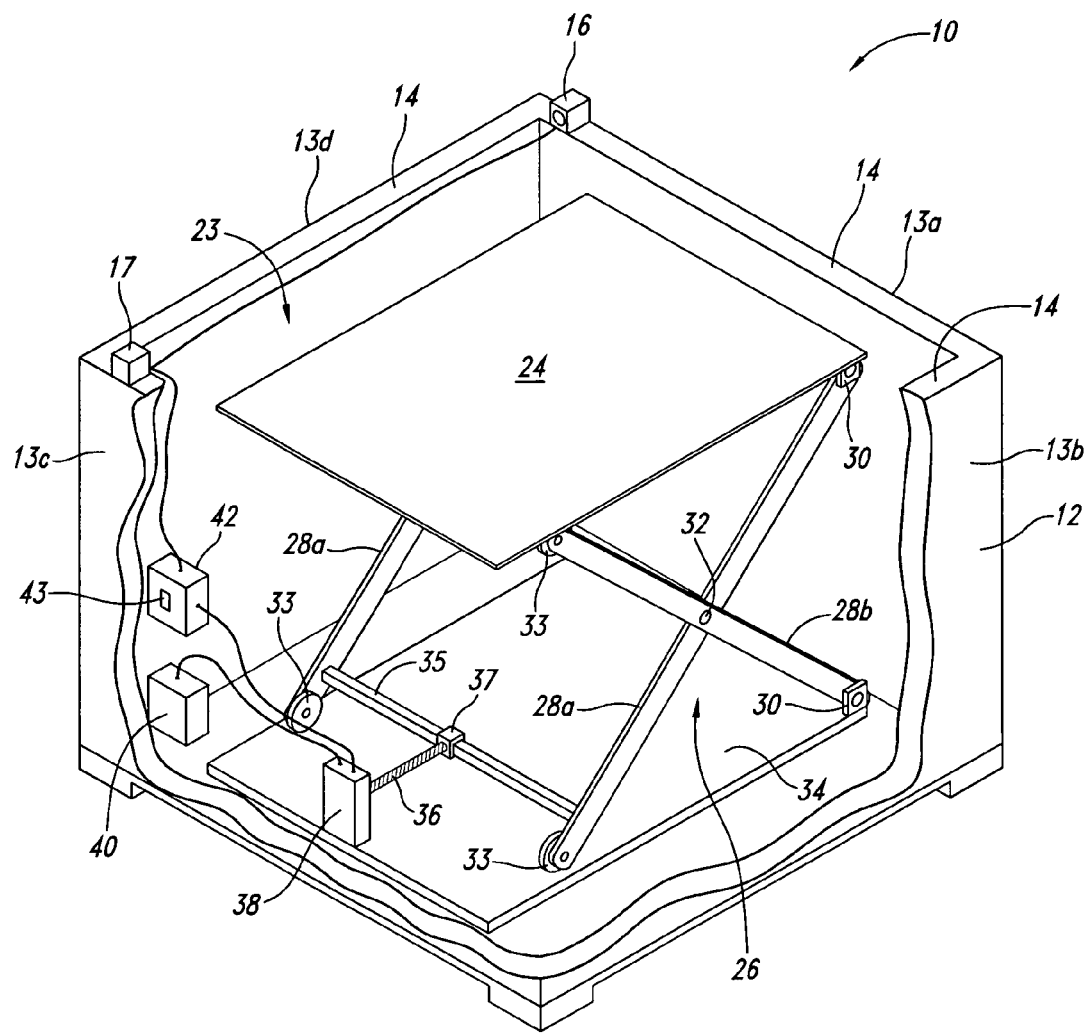
FIG. 2 is an isometric sectional view of the self-adjusting goods display system of FIG. 1 showing interior components.

Coupled between the support member 28a of each pair of scissor support members is a bar 35 that is moved through use of a screw 36 coupled to a motor 38 attached to the mounting plate 34. The motor 38 may be an electric, pneumatic, or hydraulic motor, or other type of motive force source, and can provide a rotary, linear or other output. In the illustrated embodiment, the motor 38 rotatably drives the screw 36 and the screw is coupled to the bar 35 with a nut coupler 37. The combination of the screw 36 and the coupler 37 acts as a converter to convert rotational motion of the screw into linear motion of the bar 35. As the screw 36 is turned by the motor 38, the bar 35 is moved toward and away from the motor 38, depending on whether the screw is rotated clockwise or counter-clockwise. As the bar 35 moves, both of the support members 28a are also moved back and forth to cause the support members 28a and 28b to pivot about the pivot members 30, and the rollers 33 to roll along the mounting plate 34 and the underside of the shelf 24. According to the implementation depicted in FIG. 2, as the bar 35 is moved toward the motor 38, the vertical position of the shelf 24 is lowered by the scissor lift 26 and as the bar is moved away from the motor the vertical position of the shelf is raised by the scissor lift.

The motor 38 is electrically coupled to a battery 40 to furnish electrical energy to the motor. A controller 42 is communicatively linked to the light receiver 17 and the motor 38. In operation, upon receipt of the light 22 from the light source 16, the light receiver 17 generates a signal that is detected by the controller 42. The controller 42, in turn, activates the motor 38 to raise the shelf 24 until either the light receiver 17 ceases receiving the light 22 (as a result of obstruction caused by the newly raised elevation of one or more of the goods in the pile of goods 18 on the shelf), or the shelf reaches a predetermined maximum height.

In normal usage, when enough of the goods are removed from the pile of goods 18 on the shelf 24 for sale or otherwise that the light receiver 17 receives the light 22 from the light source 16, the controller 42 senses the signal generated by the light receiver and activates the motor 38 to cause the motor to turn the screw 36 in a direction to raise the shelf 24 until the light 22 is again obstructed by the remaining goods on the shelf and no longer received by the light receiver. As a result, the controller 42 will deactivate the motor 38, leaving the shelf 24 at its new elevated position. Consequently, the shelf 24 may be raised from the lower position shown in FIG. 3 to its highest position shown in FIG. 4 in incremental steps sized according to the height of the goods in the pile of goods 18 remaining on the shelf 24.

In such fashion, as goods are removed from the pile of goods 18 on the shelf 24 and the pile of goods starts looking somewhat depleted and the top of the pile of goods is lower than the original height (thus giving the pile of goods a less attractive appearance and making reaching down for the goods more inconvenient), the light 22 from the light source 16 will reach the light receiver 17 and cause the motor 38 to be activated. This will raise the shelf 24 until the top of the pile of goods 18 remaining on the shelf is returned to its original and more desirable position. This is done automatically and without requiring a person to restock the display bin 12 to maintain a good visual appearance for the display and to keep the goods easy accessibility to potential customers. This helps sell more goods, and saves the time and expense involved in frequent manual restocking of the bin.

The controller 42 is programmed to determine when the shelf 24 is at the highest level so that the motor is not activated in attempts to further raise the shelf upon receipt of the light 22 by the light receiver 17 when the final obstructing good 18' (see FIG. 4) is removed from the pile of goods 18. In some implementations the shelf 24 travels between a lower position 13 inches below the top edge 14 and an upper position 2 inches below the top so as to keep goods at an ergonomic level of approximately 30 inches above floor level at all times. Sizing of the self-adjusting goods display system 10 can differ for other implementations depending upon the results desired.

When the pile of goods 18 needs to be restocked due to such factors as insufficient quantity or expiring shelf life, an operator will activate the motor 38 typically through a manual switch 43 located on the controller 42 or elsewhere on the system 10 to lower the shelf 24 to the lower position shown in FIG. 3 or some other position desired above the lower position. The pile of goods 18 can then be replaced or augmented with additional goods. If the top level of the pile of goods 18 projects above the height of the light 22 in the area of the light 22 passing between the light source 16 and the light receiver 17, the shelf 24 will remain at its lower position, or whatever position to which it was lowered when the manual switch is returned to a position where the controller 42 again controls operation of the motor 38. As long as the height of the pile of goods 18 remains high enough in elevation so that at least one of the goods obstructs the light 22 from being received by the light receiver 17, the shelf 24 will remain at the lower position. As described above, as sufficient goods are removed the shelf 24 will be automatically moved upward.

Various maintenance procedures can be used to keep the battery 40 charged. One method lets the battery 40 discharge until the shelf 24 will not move and then the battery is replaced by a freshly charged one. Other implementations may utilize charge indicators located on the system 10 to indicate extent of charge left in the battery 40.

From the foregoing it will be appreciated that, although specific embodiments of the invention have been described herein for purposes of illustration, various modifications may be made without deviating from the spirit and scope of the invention. For instance, the depicted implementation used a battery, but other implementations can use other motive force systems such as pneumatic or hydraulic systems. Accordingly, the invention is not limited except as by the appended claims.

The invention claimed is:

1. A produce display comprising:
   a bin sized to contain a collection of produce, the bin having an interior space with access from above the bin;
   a shelf positioned within the interior space and sized to support the collection of produce;
   support members movably linked to one another to form a scissor lift and movably coupled to the shelf to adjust the vertical height for the shelf between a lower position and an upper position;
   a motor with a shaft;
   a converter, the converter configured to translate rotational motion into linear motion, the converter linked to the motor and to at least one of the support members to move the at least one support member and consequently the support members to raise the shelf when the shaft of the motor rotates in a first rotational direction;
   a light source positioned to project light across at least one of the following: a portion of the interior space and a portion of space above the interior space;
   a light receiver positioned to receive the light projected from the light source unless the collection of produce supported by the shelf is positioned to obstruct the light from reaching the light receiver; and
   a controller configured to activate the motor to rotate the shaft in the first rotational direction to raise the shelf when the light receiver receives the light and the shelf is below the upper position.

2. The system of claim 1 wherein the controller is configured to activate the motor to rotate the shaft in a second rotational direction opposite the first rotational direction to lower the shelf when a lower shelf signal is received by the controller.

3. A produce display comprising:
   a bin sized to contain a collection of produce, the bin having an interior space with access from above the bin;
   a shelf positioned within the interior space and sized to support the collection of produce;
   support members movably linked to one another and movably coupled to the shelf to adjust the vertical height for the shelf between a lower position and an upper position;
   a motor with a shaft;
   a converter, the converter configured to translate rotational motion into linear motion, the converter linked to the motor and to at least one of the support members to move the at least one support member and consequently the support members to raise the shelf when the shaft of the motor rotates in a first rotational direction;
   a light source positioned to project light across at least one of the following: a portion of the interior apace and a portion of space above the interior space;
   a light receiver positioned to receive the light projected from the light source unless the collection of produce supported by the shelf is positioned to obstruct the light from reaching the light receiver;
   a controller configured to activate the motor to rotate the shaft in the first rotational direction to raise the shelf when the light receiver receives the light and the shelf is below the upper position; and
   first and second pivot members, wherein the support members are movably linked to one another by the first pivot members and wherein the support members are movably coupled to the shelf by the second pivot members.

4. The system of claim 1 further including a bar coupled to two of the support members, and wherein the converter includes a screw and a coupler, the shaft of the motor being drivably coupled to the screw, and the screw being threadably attached to the bar such that as the motor rotates the screw the screw applies a linear force to the coupler which is transmitted to the bar to adjustably move the two support members to change the vertical height of the shelf.

5. The system of claim 1 wherein the motor is an electric motor and is powered by a battery.

6. The system of claim 1 wherein the motor is a pneumatic motor or source.

7. The system of claim 1 wherein the controller includes a manual switch to activate the motor.

* * * * *